(12) United States Patent
Egashira et al.

(10) Patent No.: US 9,002,607 B2
(45) Date of Patent: Apr. 7, 2015

(54) LOCK-UP CLUTCH CONTROL DEVICE

(71) Applicant: Honda Motor Co., Ltd., Tokyo (JP)

(72) Inventors: Fumio Egashira, Wako (JP); Akio Muto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/367,172

(22) PCT Filed: Dec. 17, 2012

(86) PCT No.: PCT/JP2012/082635
§ 371 (c)(1),
(2) Date: Jun. 19, 2014

(87) PCT Pub. No.: WO2013/105399
PCT Pub. Date: Jul. 18, 2013

(65) Prior Publication Data
US 2015/0006050 A1    Jan. 1, 2015

(30) Foreign Application Priority Data
Jan. 11, 2012  (JP) ................... 2012-003235

(51) Int. Cl.
 B60W 10/02   (2006.01)
 B60W 10/06   (2006.01)
 F16D 48/02   (2006.01)
(52) U.S. Cl.
 CPC ............... *F16D 25/14* (2013.01); *F16D 48/02* (2013.01)
(58) Field of Classification Search
 USPC ................... 701/68; 477/54, 57, 168
 See application file for complete search history.

(56) References Cited

U.S. PATENT DOCUMENTS

| 2003/0173125 | A1 | 9/2003 | Ishikawa |
| 2004/0082434 | A1 | 4/2004 | Segawa et al. |
| 2005/0222737 | A1* | 10/2005 | Imamura et al. ............... 701/67 |

(Continued)

FOREIGN PATENT DOCUMENTS

| JP | 60-24836 U | 2/1985 |
| JP | 8-233094 A | 9/1996 |

(Continued)

OTHER PUBLICATIONS

International Search Report dated Mar. 12, 2013 issued in corresponding application No. PCT/JP2012/082635.

*Primary Examiner* — Edwin A Young
(74) *Attorney, Agent, or Firm* — Westerman, Hattori, Daniels & Adrian, LLP (57) ABSTRACT

In a lock-up clutch control device, base hydraulic pressure calculation device calculates base hydraulic pressure Pb for engaging a lock-up clutch based on input torque from an engine, correction factor calculation device calculates correction factor α, which is greater than 0 but less than 1, for correcting the base hydraulic pressure Pb based on an input rotational speed Ni of a transmission and a cylinder cut-off state of the engine. Commanded hydraulic pressure calculation device calculates a commanded hydraulic pressure Pc from the base hydraulic pressure Pb and the correction factor α by means of: current value of commanded hydraulic pressure Pc←previous value of commanded hydraulic pressure Pc+(base hydraulic pressure Pb−previous value of commanded hydraulic pressure Pc)×α, and the commanded hydraulic pressure Pc is made to converge to the base hydraulic pressure Pb by repeating this a predetermined number of times.

4 Claims, 6 Drawing Sheets

(56) References Cited

U.S. PATENT DOCUMENTS

| | | | |
|---|---|---|---|
| 2010/0235062 A1* | 9/2010 | Moriya et al. | 701/68 |
| 2010/0312444 A1* | 12/2010 | Takamatsu et al. | 701/68 |
| 2011/0246037 A1* | 10/2011 | Shimizu et al. | 701/68 |
| 2011/0264344 A1* | 10/2011 | Yamawaki | 701/68 |

FOREIGN PATENT DOCUMENTS

| | | |
|---|---|---|
| JP | 2003-269604 A | 9/2003 |
| JP | 2004-144262 A | 5/2004 |
| JP | 2010-133488 A | 6/2010 |
| JP | 2011-220388 A | 11/2011 |

* cited by examiner

LOCK-UP CLUTCH CONTROL DEVICE

TECHNICAL FIELD

The present invention relates to a lock-up clutch control device that controls the engagement hydraulic pressure of a lock-up clutch of a torque converter disposed between an engine and a transmission.

BACKGROUND ART

An arrangement in which, when a transmission is connected via a torque converter to an engine that can run in a cylinder cut-off state, in order to prevent torque variation at the time of switching over between cylinder cut-off running and all-cylinder running of the engine from being transmitted as a shock to the vehicle body, the slip ratio of the lock-up clutch of the torque converter is temporarily increased at the time of switching, is known from Patent Document 1 below.

RELATED ART DOCUMENTS

Patent Documents

Patent Document 1: Japanese Utility Model Application Laid-open No. 60-24836

SUMMARY OF THE INVENTION

Problems to be Solved by the Invention

When the accelerator pedal position is constant, the hydraulic pressure that is required to maintain the lock-up clutch in an engaged state (base hydraulic pressure) is calculated from the input torque inputted from the engine to the lock-up clutch and the target slip ratio of the lock-up clutch. However, when the accelerator pedal is depressed, the actual engine torque increases with a delay relative to the target engine torque, the base hydraulic pressure of the lock-up clutch is calculated to be a higher value than necessary, and the transmission sometimes generates abnormal noise, particularly when the engine is rotating at low speed or running in a cylinder cut-off state. In order to prevent this, if the base hydraulic pressure is set at a low level in advance, then there is a possibility that the lock-up clutch will slip when the engine is rotating at high speed or running with all cylinders.

The present invention has been accomplished in light of the above circumstances, and it is an object thereof to appropriately set a base hydraulic pressure of a lock-up clutch of a torque converter.

Means for Solving the Problems

In order to attain the above object, according to a first aspect of the present invention, there is provided lock-up clutch control device for controlling the engagement hydraulic pressure of a lock-up clutch of a torque converter disposed between an engine and a transmission, the device comprising base hydraulic pressure calculation means that calculates, based on an input torque from the engine, a base hydraulic pressure Pb for engaging the lock-up clutch, input rotational speed calculation means that detects an input rotational speed of the transmission, cylinder cut-off detection means that detects a cylinder cut-off state of the engine, correction factor calculation means that calculates, based on the input rotational speed of the transmission detected by the input rotational speed calculation means and the cylinder cut-off state of the engine, a correction factor $\alpha$, which is greater than 0 but less than 1, for correcting the base hydraulic pressure Pb, and commanded hydraulic pressure calculation means that calculates a commanded hydraulic pressure Pc of the lock-up clutch from the base hydraulic pressure Pb and the correction factor $\alpha$, wherein the commanded hydraulic pressure calculation means calculates the commanded hydraulic pressure Pc from the base hydraulic pressure Pb and the correction factor $\alpha$ by means of: current value of commanded hydraulic pressure Pc←previous value of commanded hydraulic pressure Pc+(base hydraulic pressure Pb−previous value of commanded hydraulic pressure Pc)×$\alpha$, and the commanded hydraulic pressure Pc is made to converge to the base hydraulic pressure Pb by repeating the calculation a predetermined number of times.

Further, according to a second aspect of the present invention, in addition to the first aspect, the smaller the input rotational speed of the transmission detected by the input rotational speed calculation means the smaller the correction factor $\alpha$ is set.

Furthermore, according to a third aspect of the present invention, in addition to any one of the first or second aspect, the correction factor $\alpha$ is set so as to be smaller when a cylinder cut-off state has been detected by the cylinder cut-off detection means than when one has not been detected.

Moreover, according to a fourth aspect of the present invention, in addition to any one of the first to third aspects, the commanded hydraulic pressure calculation means calculates the commanded hydraulic pressure Pc when the current value of the base hydraulic pressure Pb calculated by the base hydraulic pressure calculation means is larger than the previous value.

It should be noted here that an FI-ECU 12 of an embodiment corresponds to the cylinder cut-off detection means of the present invention, and a main shaft rotational speed sensor Sb of the embodiment corresponds to the input shaft rotational speed sensor of the present invention.

Effects of the Invention

In accordance with the first aspect of the present invention, the base hydraulic pressure calculation means calculates the base hydraulic pressure Pb for engaging the lock-up clutch based on the input torque from the engine, the correction factor calculation means calculates the correction factor $\alpha$, which is greater than 0 but less than 1, for correcting the base hydraulic pressure Pb based on the input rotational speed of the transmission and the cylinder cut-off state of the engine, and the commanded hydraulic pressure calculation means calculates the commanded hydraulic pressure Pc of the lock-up clutch from the base hydraulic pressure Pb and the correction factor $\alpha$. That is, the commanded hydraulic pressure calculation means calculates the commanded hydraulic pressure Pc from the base hydraulic pressure Pb and the correction factor $\alpha$ by means of: current value of commanded hydraulic pressure Pc←previous value of commanded hydraulic pressure Pc+(base hydraulic pressure Pb−previous value of commanded hydraulic pressure Pc)×$\alpha$, and the commanded hydraulic pressure Pc is made to converge to the base hydraulic pressure Pb by repeating this a predetermined number of times; it is therefore possible to prevent the lock-up clutch from being engaged with an excessive base hydraulic pressure Pb even when the base hydraulic pressure Pb is calculated to be a high value when the accelerator pedal is depressed, thus suppressing the occurrence of abnormal noise.

Furthermore, in accordance with the second aspect of the present invention, when the input rotational speed of the transmission calculated by the input rotational speed calculation means is small, it is easy for the base hydraulic pressure Pb for engaging the lock-up clutch to become excessive, but setting the correction factor α at a small value in this situation enables the commanded hydraulic pressure Pc to be sufficiently lowered relative to the base hydraulic pressure Pb, thus suppressing the occurrence of abnormal noise.

Moreover, in accordance with the third aspect of the present invention, when a cylinder cut-off state is detected by the cylinder cut-off detection means, it is easy for the base hydraulic pressure Pb for engaging the lock-up clutch to become excessive, but setting the correction factor α at a small value in this situation enables the commanded hydraulic pressure Pc to be sufficiently lowered relative to the base hydraulic pressure Pb, thus suppressing the occurrence of abnormal noise.

Furthermore, in accordance with the fourth aspect of the present invention, since the commanded hydraulic pressure Pc is calculated by the commanded hydraulic pressure calculation means when the current value of the base hydraulic pressure Pb calculated by the base hydraulic pressure calculation means is larger than the previous value, when the base hydraulic pressure Pb becomes excessive because the accelerator pedal is depressed and the target engine torque exceeds the actual engine torque, that base hydraulic pressure Pb can be annealed by calculating the commanded hydraulic pressure Pc.

EXPLANATION OF REFERENCE NUMERALS AND SYMBOLS

11 Torque converter
12 FI-ECU(cylinder cut-off detection means)
23 Lock-up clutch
E Engine
M3 Base hydraulic pressure calculation means
M4 Correction factor calculation means
M5 Commanded hydraulic pressure calculation means
Sb Main shaft rotational speed sensor (input shaft rotational speed sensor)
T Transmission Modes for Carrying Out the Invention A mode for carrying out the present invention is explained below by reference to FIG. 1 to FIG. 6.

First Embodiment

Figure 1:
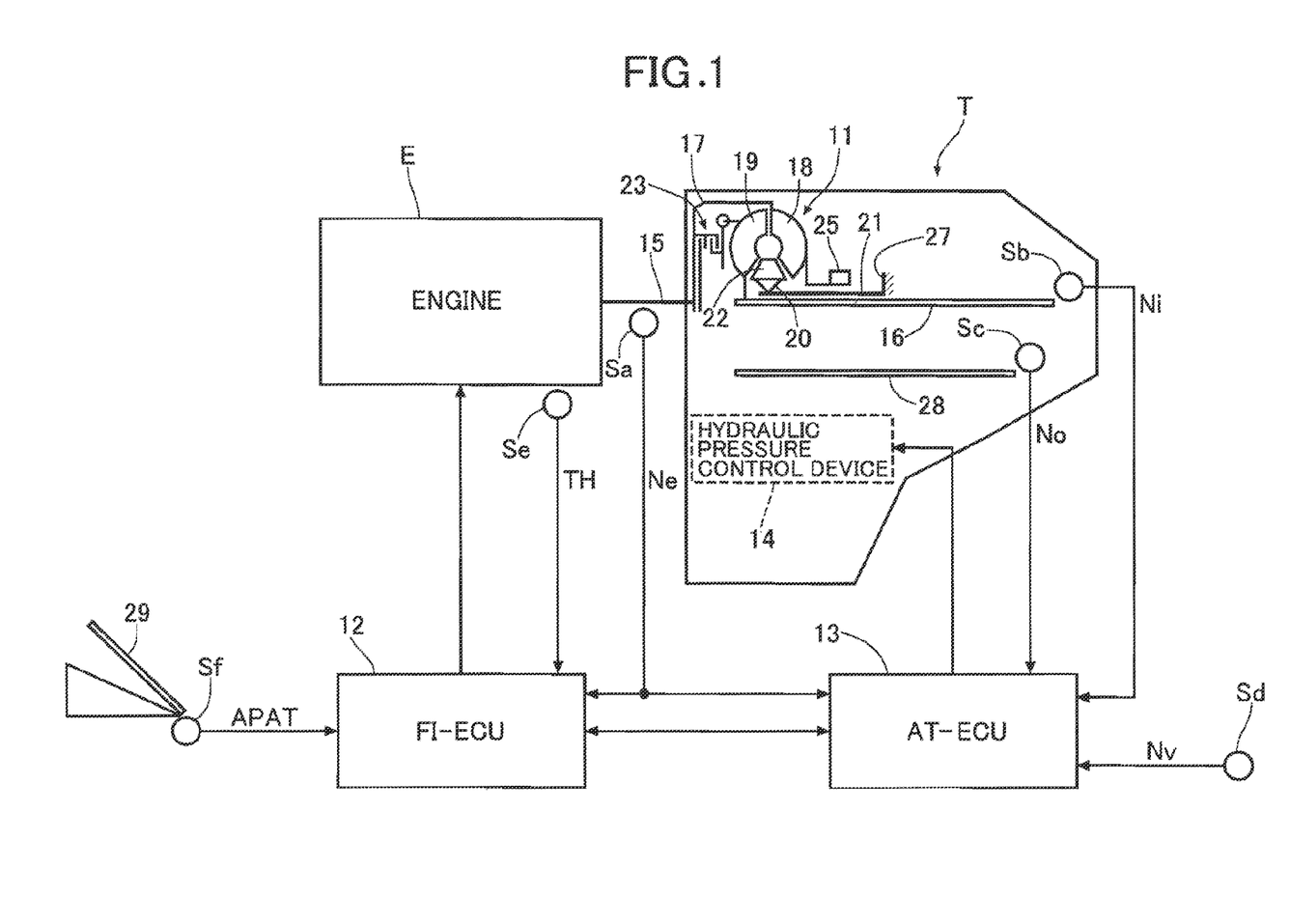
FIG. 1 is a diagram showing the outline of a control system for an engine and a transmission. (first embodiment)

As shown in FIG. 1, a vehicle of the present embodiment includes an engine E, an automatic transmission T linked to the engine E via a fluid type torque converter 11, an FI-ECU 12 for controlling the engine E, an AT-ECU 13 for controlling the transmission T, including the torque converter 11, and a hydraulic pressure control device 14 that is in charge of control of the torque converter 11, including lock-up control or control of engagement and disengagement of a plurality of frictional engagement elements of the transmission T. The lock-up control of the torque converter 11 of the present invention is carried out by the AT-ECU 13 as described later by reference to FIG. 2.

Rotation of a crankshaft 15 of the engine E is transmitted to a main shaft 16 of the transmission T via the torque converter 11. The torque converter 11 has a front cover 17, a pump impeller 18 formed integrally with the front cover 17, a turbine runner 19 disposed between the front cover 17 and the pump impeller 18 so as to oppose the pump impeller 18, and a stator vane 22 disposed between the pump impeller 18 and the turbine runner 19 and rotatably supported on a stator shaft 21 via a one-way clutch 20. The crankshaft 15 is connected to the pump impeller 18 of the torque converter 11 via the front cover 17, and the turbine runner 19 is connected to the main shaft 16 of the transmission T.

Furthermore, a lock-up clutch 23 is provided between the turbine runner 19 and the front cover 17. By operation of the hydraulic pressure control device 14 based on a command of the AT-ECU 13, the lock-up clutch 23 carries out lock-up control such that it is pushed toward an inner face of the front cover 17 and engaged with the front cover 17, and when the pushing is released engagement with the front cover 17 is released. Hydraulic oil is sealed in a container formed by the front cover 17 and the pump impeller 18.

When there is no lock-up control, relative rotation between the pump impeller 18 and the turbine runner 19 is allowed. In this state, when the rotational torque of the crankshaft 15 is transmitted to the pump impeller 18 via the front cover 17, the hydraulic oil filling the container of the torque converter 11 is circulated, by rotation of the pump impeller 18, from the pump impeller 18 to the turbine runner 19 and then to the stator vane 22. This allows the rotational torque of the pump impeller 18 to be transmitted hydrodynamically to the turbine runner 19, and during this period the torque is amplified to drive the main shaft 16. In this process, the reaction force to the torque (hereinafter, called 'stator reaction force') is borne by the stator vane 22.

On the other hand, during lock-up control, since the lock-up clutch 23 is engaged, the torque is not transmitted via hydraulic oil from the front cover 17 to the turbine runner 19, but rather the front cover 17 and the turbine runner 19 are joined integrally and rotate, and the rotational torque of the crankshaft 15 is transmitted directly to the main shaft 16. That is, the crankshaft 15 is mechanically linked to the main shaft 16 via the lock-up clutch 23 according to the amount of lock-up control.

Figure 2:
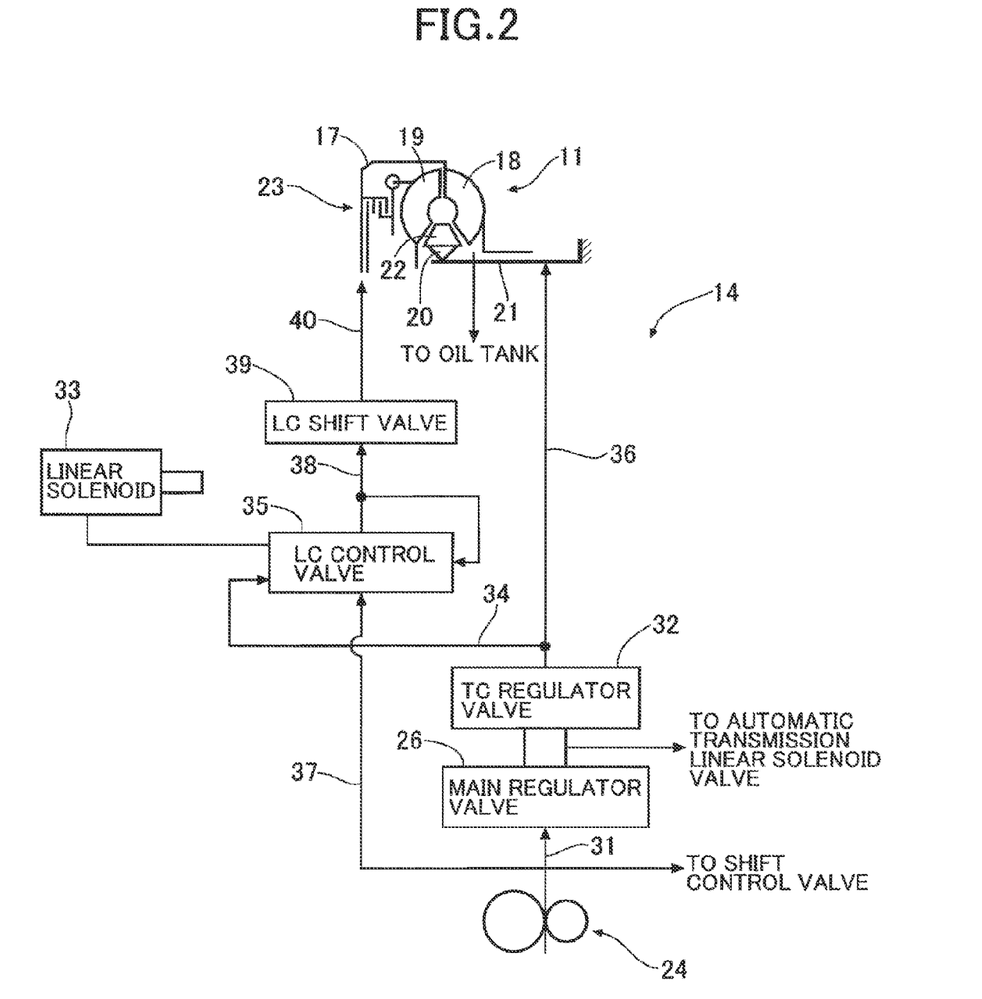
FIG. 2 is a hydraulic pressure circuit diagram of a hydraulic pressure control device of the transmission. (first embodiment)

Provided at the right end of the pump impeller 18 is a pump drive gear 25 for driving a hydraulic pump 24 shown in FIG. 2. Provided at the right end of the stator shaft 21 is a stator arm 27 for controlling a main regulator valve 26 shown in FIG. 2 when the hydraulic oil pressure (a line pressure PL) is a high line pressure.

The transmission T is for example an automatic transmission having six forward speeds and one reverse speed in the present embodiment and is provided with a plurality of gear trains according to the gear speeds and a plurality of clutches (frictional engagement elements), each gear train being formed from a drive gear and a driven gear that form a pair. Since the arrangement of the transmission T is not a feature of the present invention, detailed explanation thereof is omitted.

The rotational torque of the main shaft 16 is transmitted to a countershaft 28 via a clutch and gear train, a gear train of a secondary shaft or an idle shaft, etc., which are not illustrated. Furthermore, the rotational torque of the countershaft 28 is transmitted to a driven wheel via a gear train and differential mechanism, which are not illustrated.

The hydraulic pressure control device 14 is provided within the transmission T so as to manage the transmission T and the torque converter 11. This hydraulic pressure control device 14 supplies hydraulic oil of a line pressure PL (hydraulic oil pressure) to a target frictional engagement element to thus selectively carry out engagement and disengagement of a plurality of frictional engagement elements, which are not illustrated, within the transmission T, thereby setting any gear position from a plurality of gear positions.

Furthermore, the hydraulic pressure control device 14 supplies hydraulic oil to the pump impeller 18 of the torque converter 11 to thus control the torque converter slip ratio, which represents the degree of transmission of rotation of the crankshaft 15 to the main shaft 16, and supplies hydraulic oil to an oil chamber, which is not illustrated, of the lock-up clutch 23 to thus control engagement of the lock-up clutch 23 under predetermined conditions such as cruising of the vehicle.

Moreover, the hydraulic pressure control device 14 supplies lubricating oil for lubricating the main shaft 16, the countershaft 28, or the secondary shaft or idle shaft, which are not illustrated, to the main shaft 16, the countershaft 28, etc.

Provided in the vicinity of the crankshaft 15 of the engine E is an engine rotational speed sensor Sa for detecting an engine rotational speed Ne. Provided in the vicinity of the main shaft 16 of the transmission T is a main shaft rotational speed sensor Sb for detecting a rotational speed Ni of the main shaft 16 (an input shaft rotational speed of the transmission T), and provided in the vicinity of the countershaft 28 is a countershaft rotational speed sensor Sc for detecting a rotational speed No of the countershaft 28 (an output shaft rotational speed of the transmission T). Rotational speed data detected by the respective rotational speed sensors Sa to Sc are outputted to the AT-ECU 13.

Furthermore, provided at a predetermined position of the vehicle is a vehicle speed sensor Sd for detecting a vehicle speed Nv of the vehicle. Vehicle speed data detected by the vehicle speed sensor Sd are outputted to the AT-ECU 13. The vehicle speed Nv may be calculated from the rotational speed Ni of the main shaft 16 or the rotational speed No of the countershaft 28 without providing the vehicle speed sensor Sd, which exclusively detects the vehicle speed Nv. For example, the vehicle speed Nv may be detected (calculated) based on the relationship 'Nv=Ni×transmission ratio×tire circumference' or 'Nv=No×tire circumference'.

Provided in the vicinity of the engine E is a throttle position sensor Se for detecting a position TH of a throttle, which is not illustrated, of the engine E. Throttle position data detected by the throttle position sensor Se are outputted to the FI-ECU 12.

Provided in the vicinity of an accelerator pedal 29 is an accelerator pedal position sensor Sf linked to the accelerator pedal 29 via a wire, etc., which is not illustrated, and detecting a position (accelerator pedal position) APAT of the accelerator pedal 29. Accelerator pedal position data detected by the accelerator pedal position sensor Sf are outputted to the FI-ECU 12.

The FI-ECU 12 controls the output of the engine E, that is, the rotational speed Ne of the engine E, based on detected data inputted from the respective sensors Sa, Se, and Sf and various types of data inputted from the AT-ECU 13. Furthermore, the AT-ECU 13 controls a group of valves, which are described later, within the hydraulic pressure control device 14 based on detected data inputted from the respective sensors Sa to Sc or various data inputted from the FI-ECU 12, thus carrying out engagement of any of the plurality of frictional engagement elements. Moreover, the AT-ECU 13 carries out engagement of the lock-up clutch 23 by increasing the amount of lock-up control via the hydraulic pressure control device 14 in a predetermined running region.

The arrangement of the hydraulic pressure control device 14 for controlling the hydraulic oil for the transmission T and the torque converter 11 is now explained by reference to FIG. 2.

The hydraulic pressure control device 14 includes the hydraulic pump 24 for supplying hydraulic oil to the entire hydraulic pressure control device 14, and the hydraulic pump 24 is driven by the engine E, sucks up hydraulic oil stored in an oil tank, which is not illustrated, via an oil passage 31, and feeds it under pressure to the main regulator valve 26.

The main regulator valve 26 generates the line pressure PL by adjusting the pressure of the hydraulic oil fed from the hydraulic pump 24. The hydraulic oil at the line pressure PL adjusted for pressure by the main regulator valve 26 is supplied to a torque converter (TC) regulator valve 32 and also supplied to a linear solenoid valve, which is not illustrated, for the transmission T or a linear solenoid valve 33 for the lock-up clutch 23.

Furthermore, the hydraulic oil at the line pressure PL adjusted for pressure by the main regulator valve 26 is supplied to a CR valve, which is not illustrated. The CR valve reduces the line pressure PL of the hydraulic oil to thus generate a CR pressure (control hydraulic pressure) and supplies the hydraulic oil at the CR pressure to the respective linear solenoid valve 33, etc.

The TC regulator valve 32 controls the supply of hydraulic oil to the torque converter 11, and supplies the hydraulic oil at the line pressure PL supplied from the main regulator valve 26 to a lock-up (LC) control valve 35 via an oil passage 34. Furthermore, the TC regulator valve 32 supplies the hydraulic oil at the line pressure PL to the interior of the torque converter 3 from the back side via an oil passage 36.

The LC control valve 35 supplies the hydraulic oil at the line pressure PL, which is supplied via an oil passage 37 according to the control hydraulic pressure of the TC regulator valve 32, to a lock-up clutch (LC) shift valve 39 via an oil passage 38. The hydraulic oil at the line pressure PL thus supplied is used for lock-up control of the torque converter 11 via the LC shift valve 39.

The LC shift valve 39 controls engagement and disengagement of the lock-up clutch 23 by means of an (electromagnetic) ON/OFF solenoid valve, which is not illustrated. When the ON/OFF solenoid valve is turned ON and the LC shift valve 39 opens, hydraulic oil is supplied to the front side of the lock-up clutch 23 via the LC shift valve 39 and an oil passage 40, and this hydraulic oil is discharged to the oil tank from the back side of the lock-up clutch 23. This allows the lock-up clutch 23 to be engaged.

On the other hand, when the ON/OFF solenoid valve is turned OFF and the LC shift valve 39 is closed and the hydraulic oil is discharged to the oil tank from the front side, the lock-up clutch 23 is disengaged. The amount of slip of the lock-up clutch 23 (slip ratio of the torque converter 11), that is, an engagement capacity when the torque converter 3 slips between engagement (at the time of lock-up) and disengagement, is determined by the pressures (hydraulic pressures) of hydraulic oil supplied to the front side and the back side.

The linear solenoid valve 33 for LC generates an output pressure determined according to energization control of a solenoid coil, which is not illustrated, and makes it act on the LC control valve 35. Due to this, the hydraulic oil at the line pressure PL supplied from the main regulator valve 26 is adjusted to a pressure required for lock-up control in the LC control valve 35. This enables the engagement capacity (amount of slip) of the lock-up clutch 23 to be adjusted (controlled) by energization/de-energization of the solenoid coil of the linear solenoid valve 33.

When the lock-up clutch 23 is disengaged (that is, the lock-up control is turned OFF), the command value of the linear solenoid valve 33 is set at 0, the LC control valve 35 is closed, and the ON/OFF solenoid valve for switching between opening and closing of the LC shift valve 39 is turned OFF.

Figure 3:
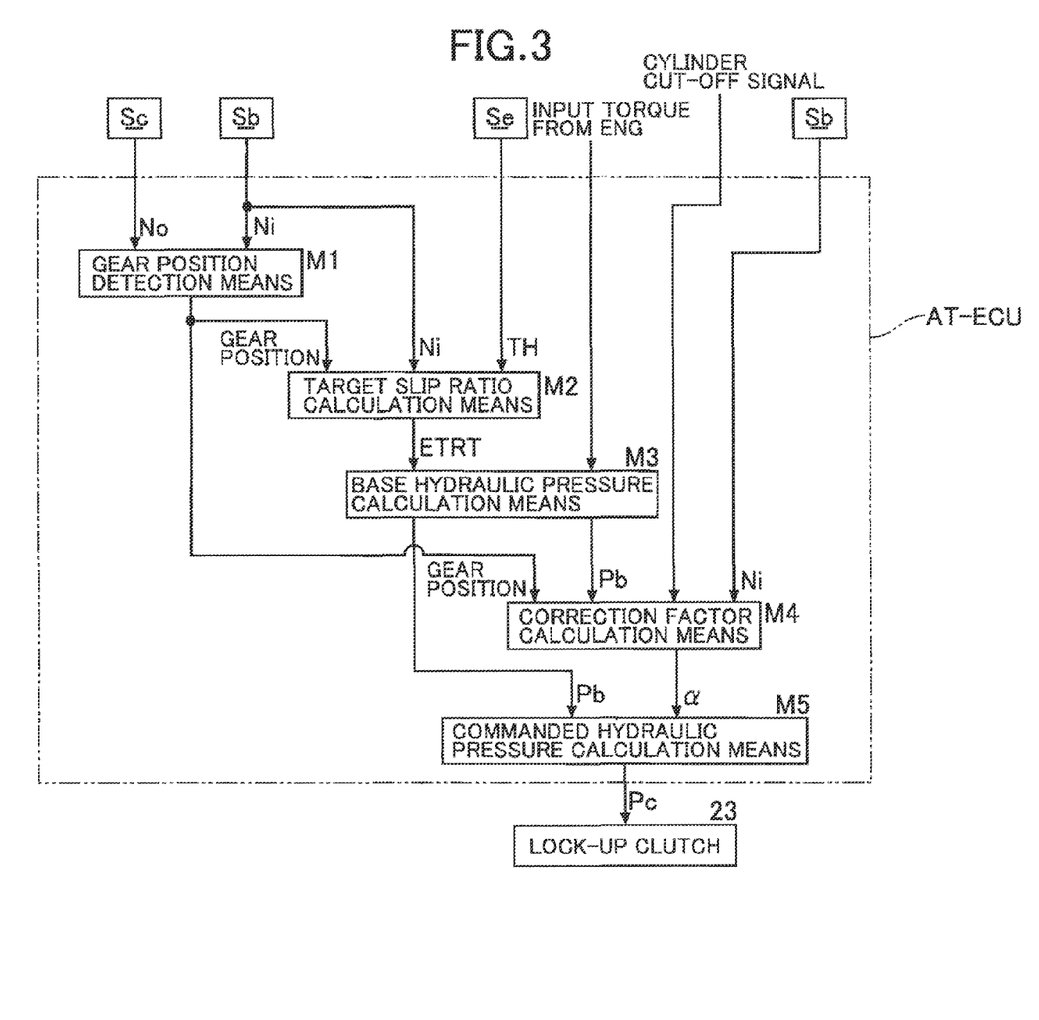
FIG. 3 is a block diagram of a control system for a lock-up clutch. (first embodiment)

FIG. 3 is a block diagram of a part, involved in control of the lock-up clutch 23, of the AT-ECU 13. As is clear from FIG. 3, the AT-ECU 13 includes gear position detection means M1, target slip ratio calculation means M2, base hydraulic pressure calculation means M3, correction coefficient calculation means M4, and commanded hydraulic pressure calculation means M5; when in order to control the engagement capacity of the lock-up clutch 23, the commanded hydraulic pressure calculation means M5 calculates a commanded hydraulic pressure Pc, which is a command value for a hydraulic pressure to be supplied to the lock-up clutch 23, the linear solenoid valve 33 supplies a predetermined output pressure to the LC control valve 35 to thus make it output the commanded hydraulic pressure Pc.

Figure 4:
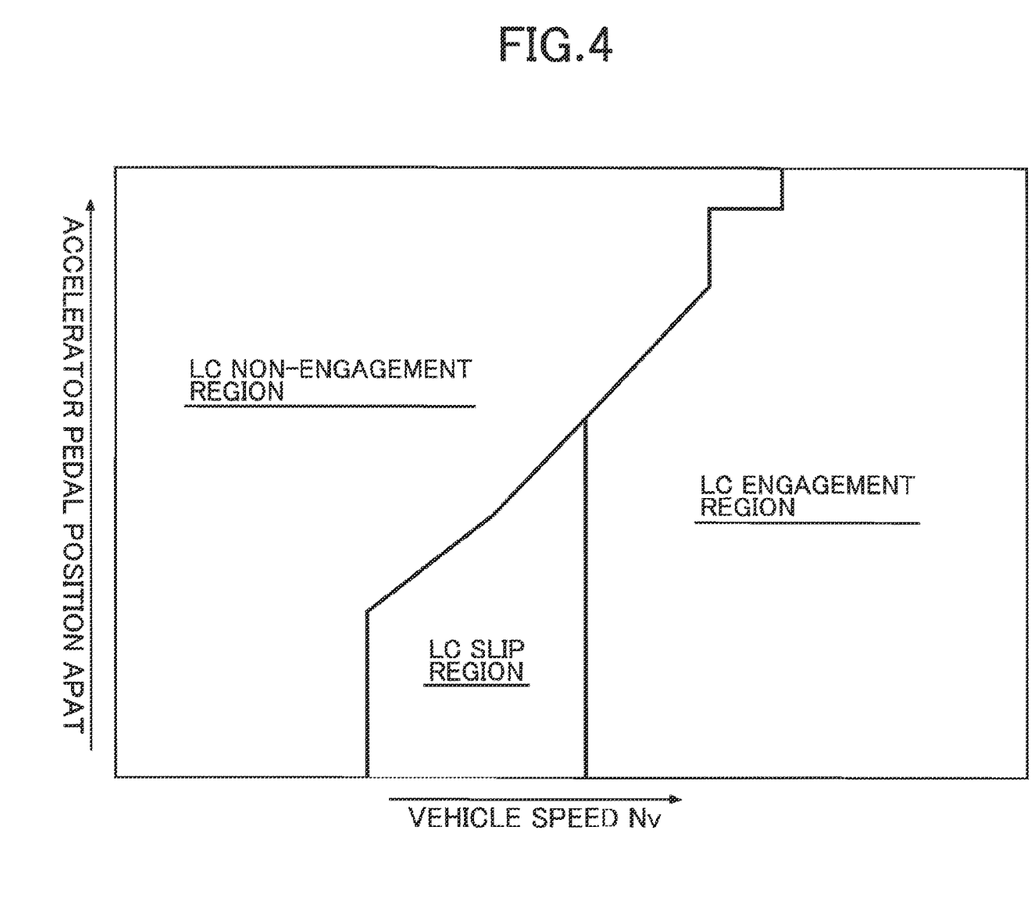
FIG. 4 is a diagram showing a map in which each control region for the lock-up clutch is looked up. (first embodiment)

The lock-up clutch 23 of the torque converter 11 is subjected to engagement control when the vehicle is under predetermined running conditions (in a lock-up clutch engagement region). That is, the vehicle speed Nv detected by the vehicle speed sensor Sd and the accelerator pedal position APAT detected by the accelerator pedal position sensor Sf are applied to the map shown in FIG. 4, and when the vehicle speed Nv and the accelerator pedal position APAT are in the lock-up clutch engagement region, the lock-up clutch 23 of the torque converter 11 is subjected to engagement control.

In FIG. 3, the gear position detection means M1 detects a gear position currently established in the transmission T from a gear ratio calculated based on the rotational speed Ni of the main shaft 16 of the transmission T detected by the main shaft rotational speed sensor Sb and the rotational speed No of the countershaft 28 of the transmission T detected by the countershaft rotational speed sensor Sc.

The target slip ratio calculation means M2 calculates a target slip ratio ETRT of the torque converter 11 by map lookup using the rotational speed Ni of the main shaft 16 of the transmission T detected by the main shaft rotational speed sensor Sb and the throttle position TH detected by the throttle position sensor Se and inputted via the FI-ECU 12. This target slip ratio ETRT is changed over for each gear position.

The base hydraulic pressure calculation means M3 calculates the base hydraulic pressure Pb of the lock-up clutch 23 based on the target slip ratio ETRT calculated by the target slip ratio calculation means M2, the input torque from the engine obtained by communication with the E FI-ECU 12, pre-stored torque converter characteristics of the torque converter 11, and pre-stored capacity characteristics of the lock-up clutch 23.

The correction coefficient calculation means M4 calculates a correction factor α for correcting the base hydraulic pressure Pb, based on the gear position detected by the gear position detection means M1, the base hydraulic pressure Pb calculated by the base hydraulic pressure calculation means M3, a cylinder cut-off signal obtained by communication with the FI-ECU 12, and the rotational speed Ni of the main shaft 16 (that is, the rotational speed of the turbine runner 19 of the torque converter 11) detected by the main shaft rotational speed sensor Sb.

Figure 5:
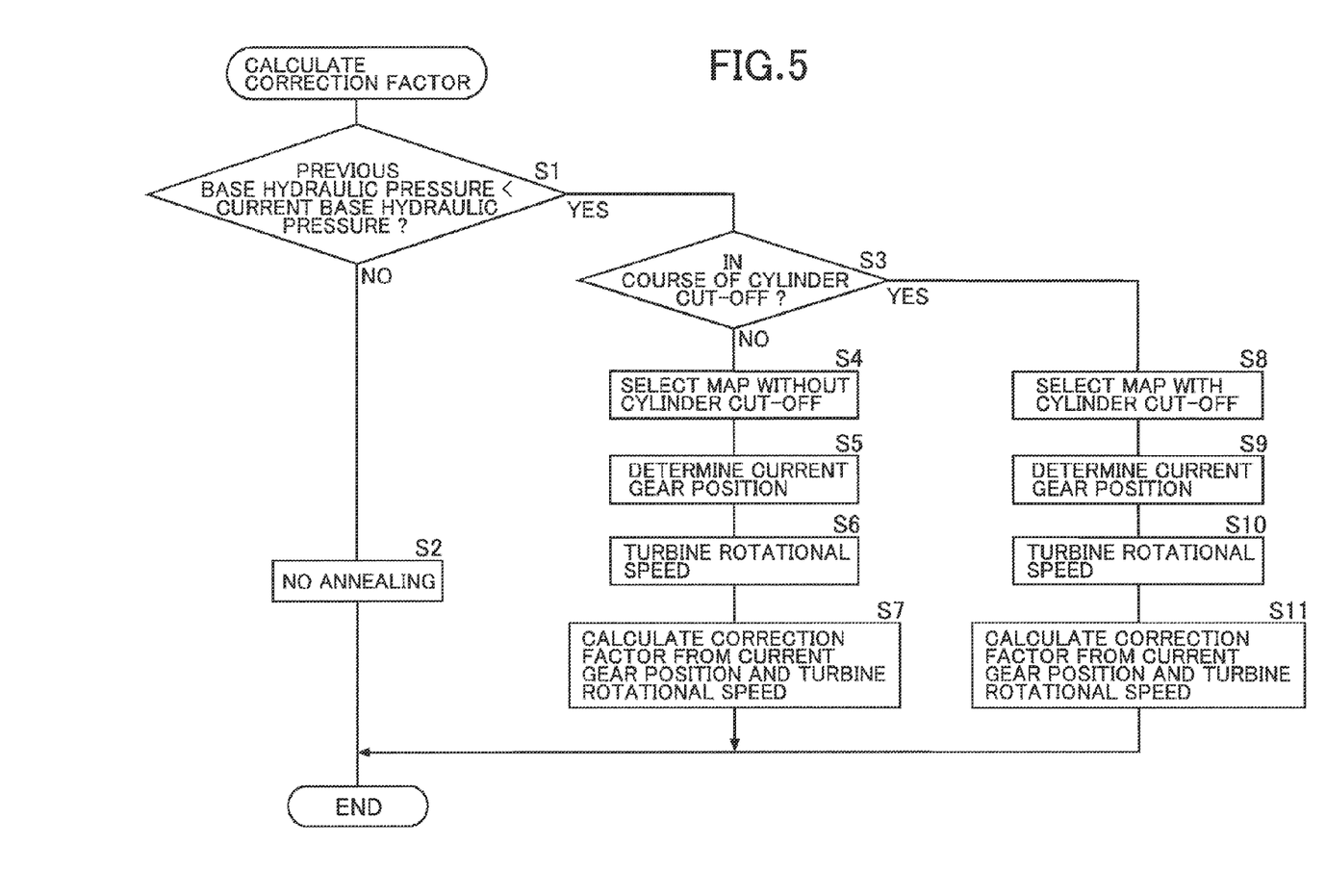
FIG. 5 is a flowchart of correction factor calculation. (first embodiment)

The flowchart of FIG. 5 further specifically explains the operation of the correction coefficient calculation means M4; first, in step S1 the previous base hydraulic pressure Pb and the current base hydraulic pressure Pb are compared, and if the current value does not exceed the previous value, that is, the current value is no greater than the previous value, then in step S2 annealing of the base hydraulic pressure Pb is not carried out.

If, in step S1 above, the current value exceeds the previous value, then in step S3 it is determined whether or not the engine E is running in a cylinder cut-off state (in the course of cylinder cut-off running) If, in step S3 above, it is not in the course of cylinder cut-off running, that is, it is in the course of all-cylinder running, then in step S4 a map without cylinder cut-off is selected, in step S5 the current gear position is determined, in step S6 the rotational speed of the turbine runner 19 of the torque converter 11 (the input rotational speed Ni of the transmission T) is read in, and in step S7 the current gear position and the rotational speed of the turbine runner 19 are applied to the map without cylinder cut-off to thus calculate the correction factor α.

On the other hand, if in step S3 above the engine E is running in a cylinder cut-off state, that is, it is in the course of cylinder cut-off running, then in step S8 a map with cylinder cut-off is selected, in step S9 the current gear position is determined, in step S10 the rotational speed of the turbine runner 19 of the torque converter 11 (the input rotational speed Ni of the transmission T) is read in, and in step S11 the current gear position and the rotational speed of the turbine runner 19 are applied to the map with cylinder cut-off to thus calculate the correction factor α.

The correction factor α has a value that is greater than 0 but less than 1; the smaller the rotational speed of the turbine runner 19 of the torque converter 11 (the input rotational speed Ni of the transmission T) the smaller the value it is set at, and is set at a smaller value for cylinder cut-off running conditions than for all-cylinder running conditions. The smaller the correction factor α, the larger the degree of annealing of the base hydraulic pressure Pb.

Figure 6:
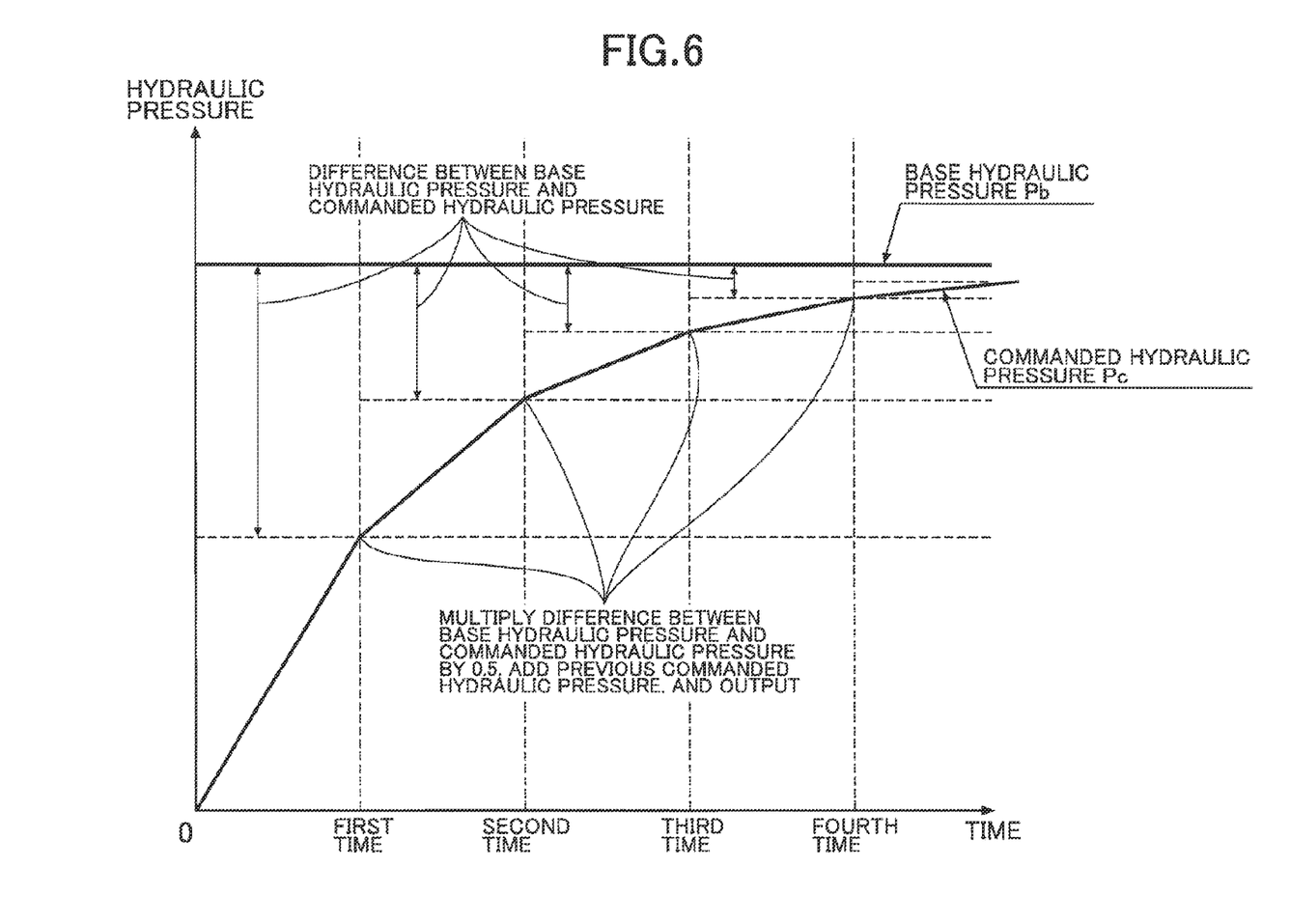
FIG. 6 is a diagram for explaining a method for calculating a commanded hydraulic pressure Pc from a base hydraulic pressure Pb using a correction factor α. (first embodiment)

FIG. 6 is a time chart showing the relationship between the base hydraulic pressure Pb and the commanded hydraulic pressure Pc when the correction factor α=0.5 and the previous value of the commanded hydraulic pressure Pc=0; calculating the commanded hydraulic pressure Pc obtained by annealing the base hydraulic pressure Pb using the correction factor α for each cycle enables the commanded hydraulic pressure Pc to be made to converge to the base hydraulic pressure Pb.

That is, the initial value for the commanded hydraulic pressure Pc is 0, and a value [Pb×α] obtained by multiplying the base hydraulic pressure Pb by the correction factor α in the first cycle is defined as the commanded hydraulic pressure Pc. At this point, the commanded hydraulic pressure Pc is annealed by ½ of the base hydraulic pressure Pb. In a second cycle, a value [commanded hydraulic pressure Pc+(base hydraulic pressure Pb−commanded hydraulic pressure Pc)×α] obtained by adding to the commanded hydraulic pressure Pc a value obtained by multiplying by the correction factor α the differential pressure between the commanded hydraulic pressure Pc and the base hydraulic pressure Pb in the first cycle is defined as the commanded hydraulic pressure Pc. At this point, the commanded hydraulic pressure Pc is annealed by ¼ of the base hydraulic pressure Pb. Due to this procedure being repeated, the commanded hydraulic pressure Pc is annealed by ⅛ of the base hydraulic pressure Pb in a third cycle, and the commanded hydraulic pressure Pc is annealed by 1/16 of the base hydraulic pressure Pb in a fourth cycle.

The commanded hydraulic pressure Pc thus annealed by the above procedure converges to the base hydraulic pressure Pb, and calculation of the commanded hydraulic pressure Pc is ended when the cycles have been completed a predetermined number of times or when the difference between the base hydraulic pressure Pb and the commanded hydraulic pressure Pc becomes a predetermined value or below. When the commanded hydraulic pressure calculation means M5 (see FIG. 3) calculates the commanded hydraulic pressure Pc by annealing the base hydraulic pressure Pb as above, the lock-up clutch 23 is engaged with the commanded hydraulic pressure Pc.

As described above, when the accelerator pedal is depressed, since the actual engine torque increases with a delay relative to the target engine torque, there is a possibility that the base hydraulic pressure Pb calculated based on the input torque from the engine E will become higher than necessary, the lock-up clutch 23 will be engaged with excessive capacity, and the transmission T will generate abnormal noise, but since the base hydraulic pressure Pb is annealed with the commanded hydraulic pressure Pc calculated from the correction factor α, it is possible to suppress the engagement capacity to the minimum required while preventing the lock-up clutch 23 from slipping, thus preventing the transmission T from generating abnormal noise.

In particular, when the input rotational speed of the transmission T is small and the engine E is in a cylinder cut-off state, the base hydraulic pressure Pb for engaging the lock-up clutch 23 easily becomes excessive, but setting the correction factor α at a small value in this situation enables the commanded hydraulic pressure Pc to be sufficiently lowered relative to the base hydraulic pressure Pb. Moreover, since the base hydraulic pressure Pb is annealed by calculating the commanded hydraulic pressure Pc only when the current value of the base hydraulic pressure Pb is larger than the previous value, when the base hydraulic pressure Pb becomes excessive because the accelerator pedal 29 is depressed and the target engine torque exceeds the actual engine torque, that base hydraulic pressure Pb can be annealed.

An embodiment of the present invention is explained above, but the present invention may be modified in a variety of ways as long as the modifications do not depart from the spirit and scope thereof For example, in the embodiment the base hydraulic pressure calculation means M3 calculates the base hydraulic pressure Pb based on the target slip ratio ETRT, the input torque from the engine E, the torque converter characteristics of the torque converter 11, and the capacity characteristics of the lock-up clutch 23, but the method for calculating the base hydraulic pressure Pb is not limited thereto, and calculation may be carried out based on at least the input torque from the engine E.

The invention claimed is:

1. A lock-up clutch control device for controlling the engagement hydraulic pressure of a lock-up clutch of a torque converter disposed between an engine and a transmission, the device comprising
base hydraulic pressure calculation device that calculates, based on an input torque from the engine, a base hydraulic pressure Pb for engaging the lock-up clutch,
input rotational speed calculation device that detects an input rotational speed of the transmission,
cylinder cut-off detection device that detects a cylinder cut-off state of the engine,
correction factor calculation device that calculates, based on the input rotational speed of the transmission detected by the input rotational speed calculation device and the cylinder cut-off state of the engine, a correction factor α, which is greater than 0 but less than 1, for correcting the base hydraulic pressure Pb, and
commanded hydraulic pressure calculation device that calculates a commanded hydraulic pressure Pc of the lock-up clutch from the base hydraulic pressure Pb and the correction factor α, wherein
the commanded hydraulic pressure calculation device calculates the commanded hydraulic pressure Pc as a present value from the base hydraulic pressure Pb and the correction factor α by adding to a previous value of the commanded hydraulic pressure a value obtained by multiplying a differential pressure between the base hydraulic pressure Pb and the previous value of the commanded hydraulic pressure Pc by the correction factor α, and the commanded hydraulic pressure Pc is made to converge to the base hydraulic pressure Pb by repeating the calculation a predetermined number of times.

2. The lock-up clutch control device according to claim 1, wherein the smaller the input rotational speed of the transmission detected by the input rotational speed calculation device the smaller the correction factor α is set.

3. The lock-up clutch control device according to claim 1, wherein the correction factor α is set so as to be smaller when a cylinder cut-off state has been detected by the cylinder cut-off detection device than when one has not been detected.

4. The lock-up clutch control device according to claim 1, wherein the commanded hydraulic pressure calculation device calculates the commanded hydraulic pressure Pc when the current value of the base hydraulic pressure Pb calculated by the base hydraulic pressure calculation device is larger than the previous value.

* * * * *